US006175567B1

United States Patent
Yoo

(10) Patent No.: US 6,175,567 B1
(45) Date of Patent: Jan. 16, 2001

(54) METHOD AND SYSTEM FOR MULTIPLEXING/DEMULTIPLEXING ASYNCHRONOUS TRANSFER MODE INTERPROCESSOR COMMUNICATION (ATM IPC) CELL IN EXCHANGE

(75) Inventor: Si-Hyoung Yoo, Seoul (KR)

(73) Assignee: Samsung Electronics Co. Ltd., Suwon (KR)

(*) Notice: Under 35 U.S.C. 154(b), the term of this patent shall be extended for 0 days.

(21) Appl. No.: 08/910,426

(22) Filed: Aug. 13, 1997

(30) Foreign Application Priority Data

Aug. 13, 1996 (KR) .................................... 96-33620

(51) Int. Cl.[7] ................................................ H04L 12/56
(52) U.S. Cl. .......................... 370/395; 370/422; 370/535
(58) Field of Search .................................... 370/395, 397, 370/398, 399, 412, 535, 366, 422

(56) References Cited

U.S. PATENT DOCUMENTS

| | | | |
|---|---|---|---|
| 5,119,369 | 6/1992 | Tanabe et al. ........................ | 370/392 |
| 5,189,668 | 2/1993 | Takatori et al. ....................... | 370/427 |
| 5,214,642 | 5/1993 | Kunimoto et al. .................... | 370/471 |
| 5,258,977 | 11/1993 | Wolker et al. ........................ | 370/395 |
| 5,287,349 | 2/1994 | Hyodo et al. ......................... | 370/399 |
| 5,303,236 | * 4/1994 | Kunimoto et al. .................... | 370/398 |
| 5,339,310 | 8/1994 | Taniguchi .............................. | 370/397 |
| 5,365,519 | 11/1994 | Kozaki et al. ........................ | 370/378 |
| 5,448,557 | 9/1995 | Hauber .................................. | 370/396 |
| 5,487,063 | * 1/1996 | Kakuma et al. ...................... | 370/396 |
| 5,499,238 | 3/1996 | Shon ...................................... | 370/399 |
| 5,504,742 | * 4/1996 | Kakuma et al. ...................... | 370/420 |
| 5,513,178 | 4/1996 | Tanaka .................................. | 370/395 |
| 5,519,707 | 5/1996 | Subramanian et al. .............. | 370/399 |
| 5,548,588 | 8/1996 | Ganmukhi et al. ................... | 370/395 |
| 5,550,978 | 8/1996 | Takahashi et al. ................... | 709/236 |
| 5,594,723 | 1/1997 | Tibi ....................................... | 370/396 |
| 5,612,695 | 3/1997 | Ueda ..................................... | 341/101 |
| 5,623,493 | 4/1997 | Kagemoto ............................. | 370/397 |
| 5,896,371 | * 4/1999 | Kobayashi et al. .................. | 370/232 |

* cited by examiner

Primary Examiner—Hassan Kizou
Assistant Examiner—Saba Tsegaye
(74) Attorney, Agent, or Firm—Robert E. Bushnell, Esq.

(57) ABSTRACT

A system for multiplexing/demultiplexing an ATM IPC cell in an ATM exchange. The system includes an IPC cell multiplexing/demultiplexing circuit connected between an operation and maintenance processor, first to third subscriber control processors and an ATM switch. The IPC cell multiplexing/demultiplexing circuit reads a virtual path identifier (VPI) value of an IPC cell received from the ATM switch to select a processor to transfer the IPC cell to, transfers the received IPC cell to the corresponding processor at a speed of 100 Mbps, and multiplexes the IPC cell received from a specific processor among the operation and maintenance processor and the first to third subscriber control processors.

22 Claims, 14 Drawing Sheets

METHOD AND SYSTEM FOR MULTIPLEXING/DEMULTIPLEXING ASYNCHRONOUS TRANSFER MODE INTERPROCESSOR COMMUNICATION (ATM IPC) CELL IN EXCHANGE

CLAIM FOR PRIORITY

This application makes reference to, incorporates the same herein, and claims all benefits accruing under 35 U.S.C. §119 from an application for METHOD AND SYSTEM FOR MULTIPLEXING/DEMULTIPLEXING ASYNCHRONOUS TRANSFER MODE INTERPROCESSOR COMMUNICATION (ATM IPC) CELL IN EXCHANGE earlier filed in the Korean Industrial Property Office on the 14th of August 1996, and there duly assigned Serial No. 33620/1996, a copy of which application is annexed hereto.

BACKGROUND OF THE INVENTION

1. Technical Field

The present invention relates to an asynchronous transfer mode (ATM) exchange, and more particularly, relates to a system for multiplexing/demultiplexing an ATM interprocessor communication cell (IPC) in an ATM exchange.

2. Related Art

Generally, ATM is a specific packet-oriented transfer mode using an asynchronous time division multiplexing technique where both line switching and packet switching are unified and many pieces of information such as voice, data, and pictures are organized in fixed-sized blocks, called cells. ATM can operate as both a packet exchange system and a circuit exchange system in one transmission mode for efficiently embodying both high speed and wide band communication networks. For this reason, ATM is a target transfer mode solution for implementing a broadband integrated services digital network (B-ISDN) because it offers an effective information channel management based upon virtual path and virtual channel identifiers ("VPI" and "VCI") placed in a header of each cell which facilitates the use of a multiplex, de-multiplex and exchange of digital information, and serves to decrease the costs of broad-band communication network facilities because of its flexibility in a bandwidth distribution.

Conventionally, there are a variety of ATM switching networks. Exemplary configurations are disclosed, for example, in U.S. Pat. No. 5,189,668 for ATM Switch And ATM Multiplexer issued to Takatori et al, U.S. Pat. No. 5,119,369 for Packet Switch Communication Network Using Packet Using Virtual Channel Identifiers issued to Tanabe et al., U.S. Pat. No. 5,214,642 for ATM Switching System And Adaption Processing Apparatus issued to Kunimoto, U.S. Pat. No. 5,258,977 for Switching Network For An Asynchronous Time Division Multiplex Transmission System issued to Wolker et al., U.S. Pat. No. 5,287,349 for ATM Exchange System issued to Hyodo et al., U.S. Pat. No. 5,339,310 for Switching Apparatus For Switched Network Of Asynchronous Transfer Mode issued to Taniguchi, U.S. Pat. No. 5,499,238 for Asynchronous Transfer Mode (ATM) Multiplexing Process Device And Method Of The Broadband Integrated Service Digital Network Subscriber Access Apparatus issued to Shon, U.S. Pat. No. 5,455,820 for Output-Buffer Switch For Asynchronous Transfer Mode issued to Yamada, U.S. Pat. No. 5,513,178 for Cell Multiplexing Apparatus In ATM Network issued to Tanaka., U.S. Pat. No. 5,519,707 for Multiplexing Of Communication Services On A Virtual Service Path IN An ATM Network Or The Like issued to Subramanian et al., and U.S. Pat. No. 5,594,723 for ATM Information System And Multiplexer For Assigning And Controlling Access Time issued to Tibi. An ATM multiplexer/demultiplexer can be inserted between subscriber lines and the ATM switching network for switching ATM cells as disclosed in U.S. Pat. No. 5,448,557 for ATM Multiplexer/Demultiplexer For Use In An ATM Switching System issued to Hauber, or adjacent to the ATM switching network as disclosed in U.S. Pat. No. 5,365,519 for ATM Switching System Connectable To I/O Links Having Different Transmission Rates issued to Kozaki et al., and U.S. Pat. No. 5,623,493 for Multiplexer Demultiplexer Switching Device And Network Adapter issued to Kagemoto.

For the interprocessor communication (IPC) of an ATM exchange as disclosed, for example, in U.S. Pat. No. 5,550,978 for Multiprocessor System Having Switches For Routing Cells In Parallel Among Processors by Splitting Data Into Blocks Having Numbers Of Cells Equals To Processor Bus Width issued to Takahashi et al., however, one IPC cell transceiver is required for each processor connected to the ATM exchange. As the capacity of an ATM switch increases, the number of processors increases and consequently the number of IPC cell transceivers. Moreover, since one ATM switch port per IPC cell transceiver is needed, the number of the ATM switch ports increases. Therefore, a large number of hardware is required, and it is difficult to efficiently manage resources.

SUMMARY OF THE INVENTION

Accordingly, it is therefore an object of the present invention to provide a system for multiplexing or demultiplexing an interprocessor communication (IPC) cell in an ATM exchange.

It is another object of the invention to provide a system for efficiently managing new resources by multiplexing or demultiplexing an interprocessor communication (IPC) cell in an ATM exchange.

These and other objects of the invention can be achieved by a system for multiplexing/demultiplexing an ATM IPC cell in an ATM exchange which includes an IPC cell multiplexing/demultiplexing circuit connected between an operation and maintenance processor, first to third subscriber control processors and an ATM switch. The IPC cell multiplexing/demultiplexing circuit reads a virtual path identifier (VPI) value of an IPC cell received from the ATM switch to select a processor to transfer the cell to, transfers the received IPC cell to the corresponding processor at a speed of 100 Mbps, and multiplexes the IPC cell received from a specific processor among the operation and maintenance processor and the first to third subscriber control processors.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
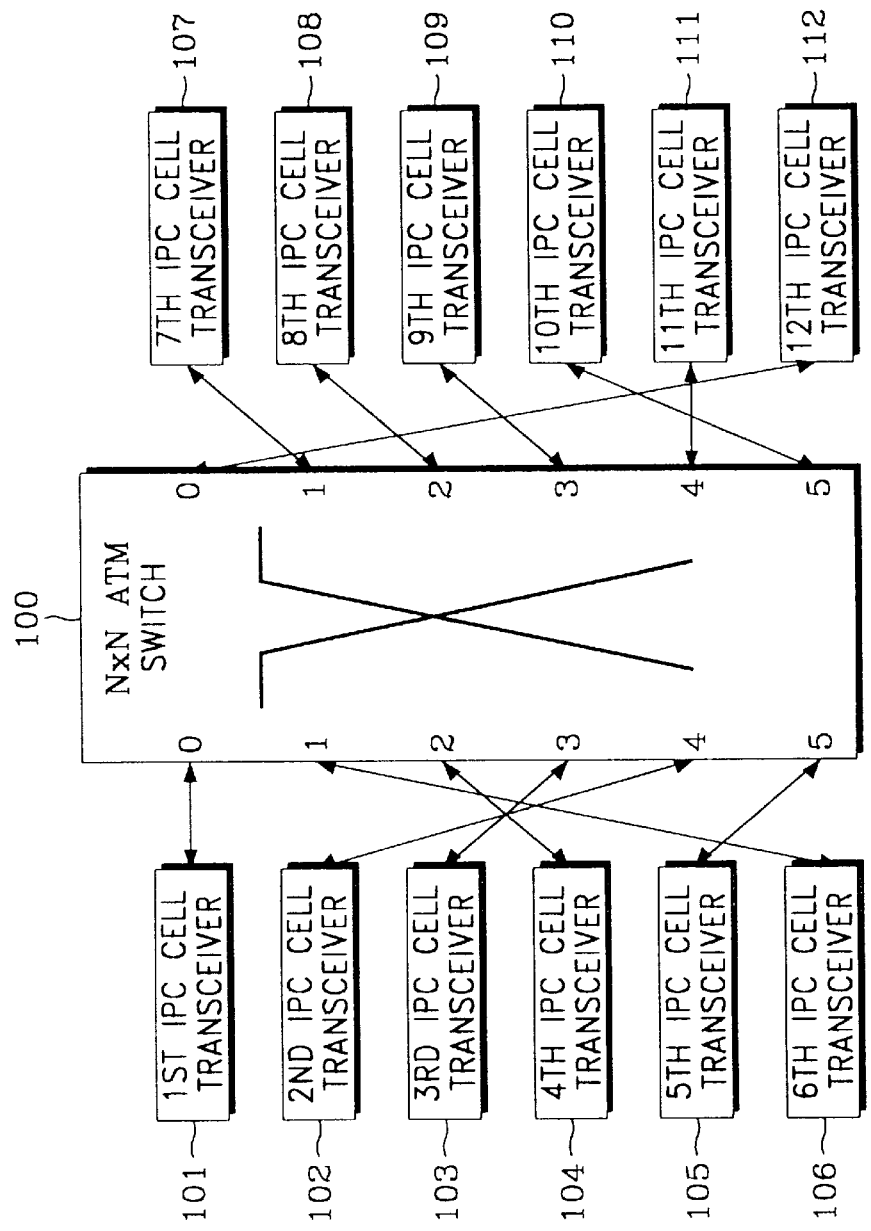
FIG. 1 is an abstract diagram illustrating a transmission path of interprocessor communication (IPC) cell in an ATM exchange.

Referring now to the drawings and particularly to FIG. 1, which illustrates an interprocessor communication (IPC) of an asynchronous transfer mode (ATM) exchange wherein one IPC cell transceiver per processor is required. As the capacity of an ATM switch 100 increases, however, the number of processors increases and simultaneously the number of IPC cell transceivers. Moreover, since one ATM switch port per IPC cell transceiver is needed, the number of the ATM switch ports increases. The number of the IPC cell transceivers increases according to an increment in subscriber ports of 155 Mbps. Such an increase in the number of the ATM switch ports leads to a serious obstacle to an increment in a system.

Figure 2:
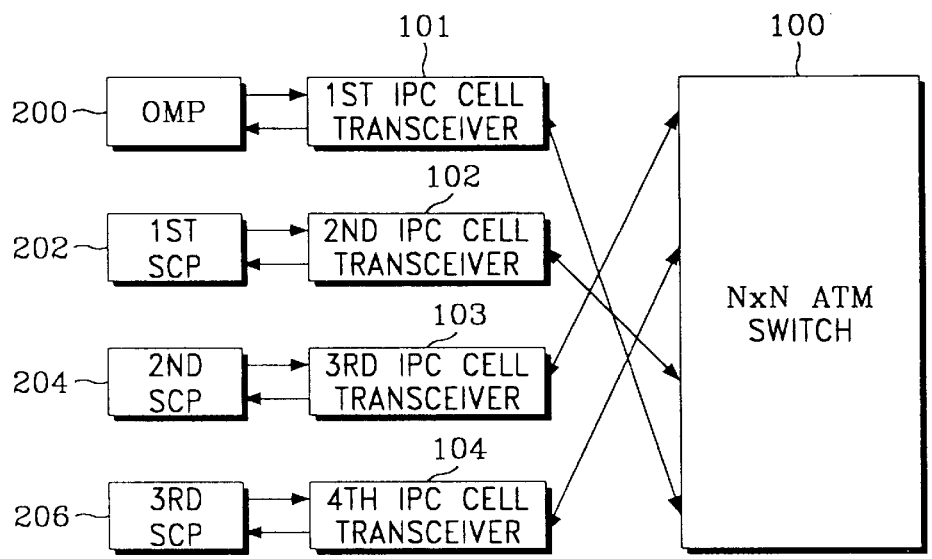
FIG. 2 is a diagram illustrating a transmission path of an IPC cell through IPC cell transceivers coupled to subscriber control processors.

In operation, when an operation and maintenance processor (OMP) 200 transfers an IPC cell, the OMP 200 generates the IPC cell and transfers the IPC cell to the first IPC cell transceiver 101 as shown in FIG. 2. The first IPC cell transceiver 101 transfers the IPC cell received from the OMP 200 to the ATM switch 100. The IPC cell is again transferred to the OMP 200 through the first IPC cell transceiver 101. In this way, first to third subscriber control processors (SCPs) 202, 204 and 206 are operated. Since one switch port is needed per processor, the number of the ports should equally increase as the processors increase in number. Therefore, a large number of hardware is required, and it is difficult to efficiently manage resources.

Figure 3:
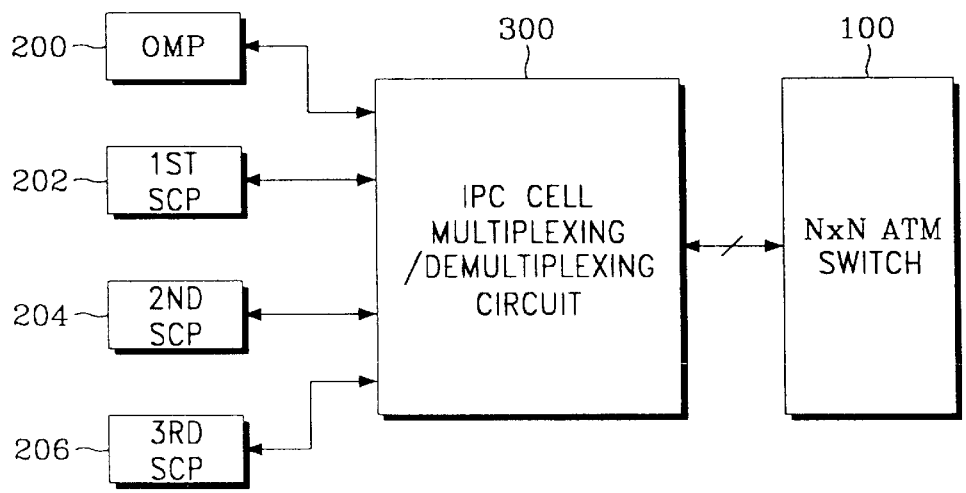
FIG. 3 is a diagram illustrating an ATM exchange using an IPC cell multiplexing/demultiplexing circuit constructed according to the principles of the present invention.

FIG. 3 which illustrates an ATM exchange using an IPC cell multiplexing/demultiplexing circuit constructed according to the principles of the present invention. The IPC cell multiplexing/demultiplexing circuit 300 is connected between the OMP 200, the first to third SCPs 202–206 and the ATM switch 100. If an IPC cell is received from the ATM switch 100, the IPC cell multiplexing/demultiplexing circuit 300 reads a virtual path identifier (VPI) value of the received IPC cell to select a destination processor to which to transfer the cell, to and then transfers the IPC cell to a corresponding processor at a speed of 100 Mbps. Meanwhile, the IPC cell received from a specific processor among the OMP 200 and the first to third SPCs 202–206 is multiplexed through the IPC cell multiplexing/demultiplexing circuit 300 and transferred to the ATM switch 100.

Figure 4:
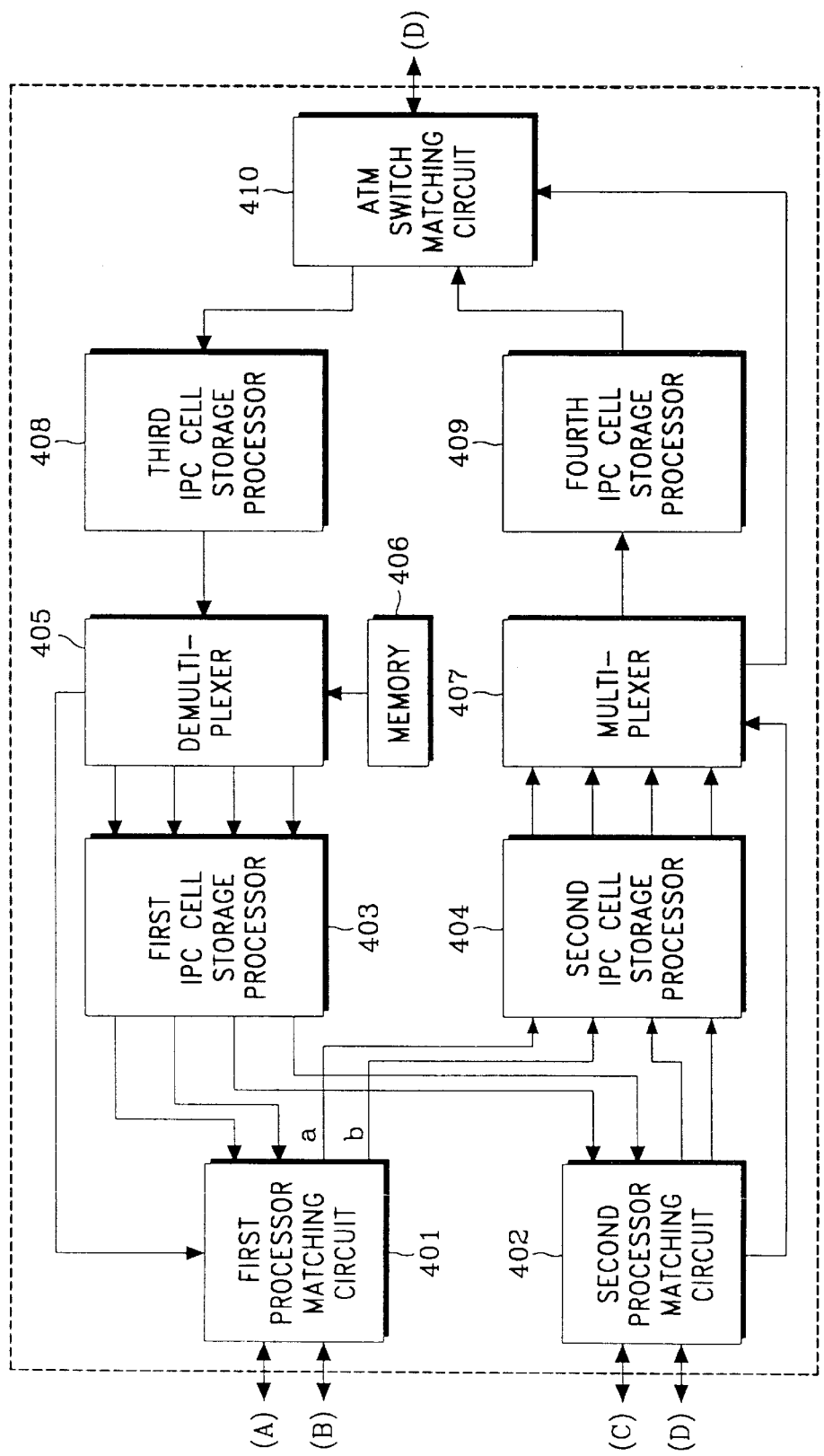
FIG. 4 is a detailed circuit diagram of the IPC cell multiplexing/demultiplexing circuit as shown in FIG. 3.

FIG. 4 illustrates a detailed circuit diagram of the IPC cell multiplexing/demultiplexing circuit 300 as shown in FIG. 3. The IPC cell multiplexing/demultiplexing circuit includes a first and a second processor matching circuit 401 and 402, a first and a second IPC cell storage processor 403 and 404, a demultiplexer 405, a memory 406, a multiplexer 407, a third and a fourth storage processors 408 and 409, and an ATM switch matching circuit 410.

First and second processor matching circuits 401 and 402 are matched to the OMP 200 and the first to third SPCs 202–206 to transfer control signals and data. A second IPC cell storage processor 404 temporarily stores data received from or to be transferred to the first and second processor matching circuits 401 and 402. A multiplexer 407 multiplexes the IPC cell generated from the second IPC cell storage processor 404. A fourth IPC cell storage processor 409 temporarily stores an output of the multiplexer 407. A memory 406 stores data for determining a transmission route of the cell. An ATM switch matching circuit 410 is matched to the ATM switch 100. A third IPC cell storage processor 408 temporarily stores the IPC cell generated from the ATM switch matching circuit 410. A demultiplexer 405 demultiplexes an output of the third IPC cell storage processor 408 and transfers the demultiplexed output to a destination determined from the memory 406. A first IPC cell storage processor 403 temporarily stores an output of the demultiplexer 405.

Figure 5:
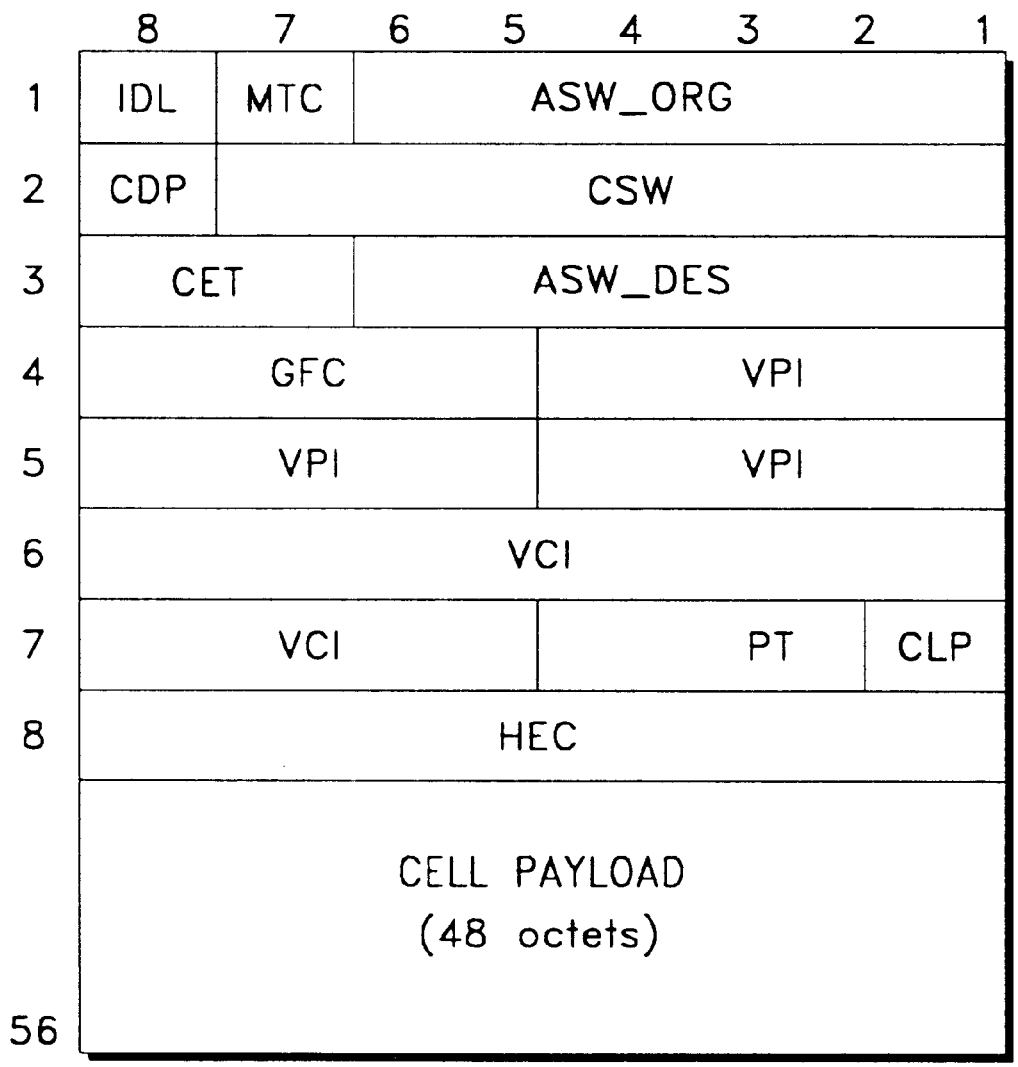
FIG. 5 illustrates a format of a 56-byte IPC cell according to the present invention.

FIG. 5 shows a format of a 56-byte IPC cell. A reference symbol IDL designates whether the transferred cell is idle or busy (represented by either "1" or "0"). MTC represents that the transferred cell is a multicast cell ("0"). CDP designates a cell delay priority (represented by "0" for high priority). CET is for discriminating between a user information cell and a system cell. CET of "00" indicates the user information cell; CET of "01" indicates a cell having broadcasting address information for updating a board caster address table within an access switch during call setup; CET of "10" indicates a cell having broadcasting address information for updating a board caster address table within a central switch during call setup; and CET of "11" designates an IPC message cell. A reference symbol ASW_ORG designates a physical address of an originating access switch, CSW a physical address of the central switch, ASW_DES a physical address of an incoming access switch, CLP a cell loss priority, GFC a generic flow control, PT a payload type, HEC a header error control, VPI a virtual path identifier, and VCI a virtual channel identifier.

Figure 6:
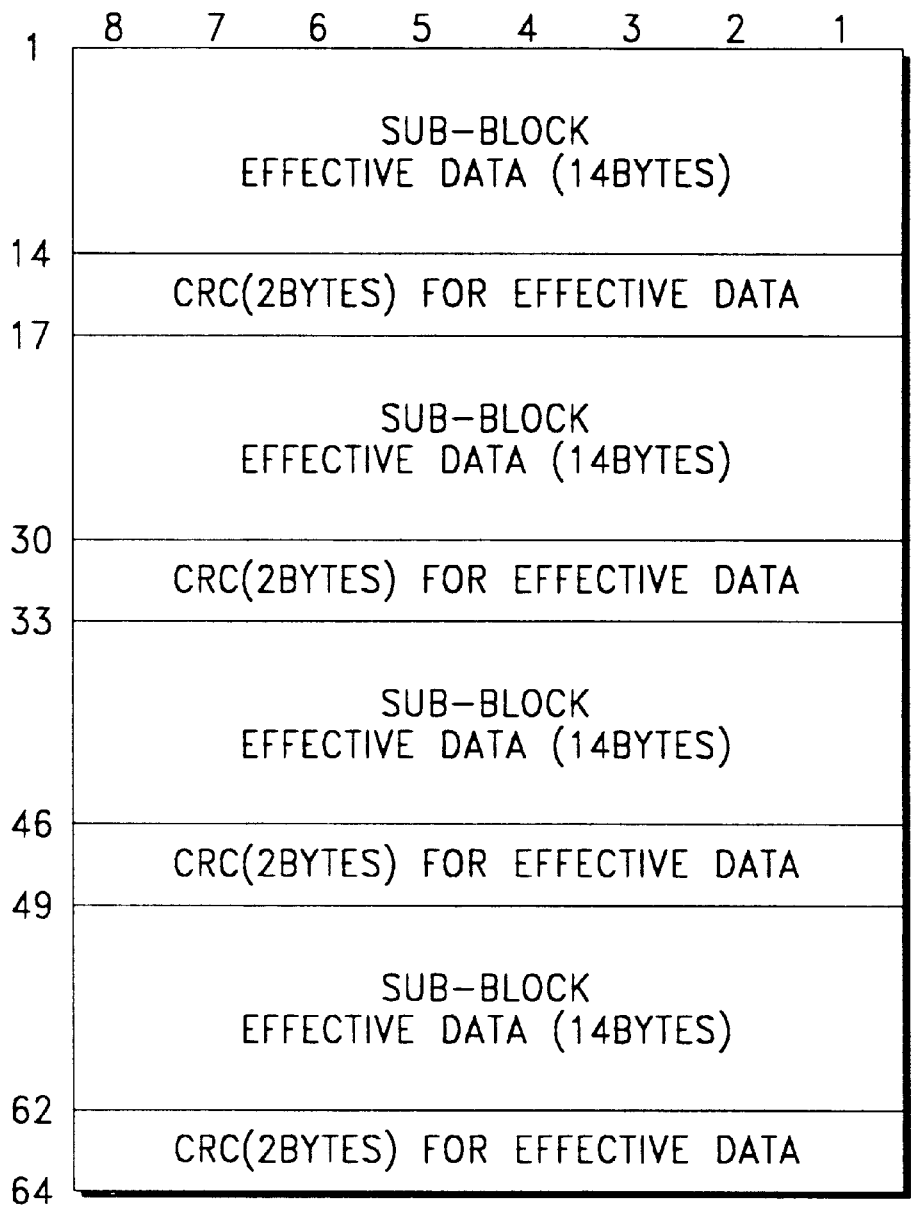
FIG. 6 illustrates a format of a 64-byte IPC cell according to the present invention.

FIG. 6 shows a format of a 64-byte IPC cell. The 56-byte cell is equally divided into sub-blocks each having 14 bytes. A cyclic redundancy check code (CRC) of effective data for the sub-blocks of 14 bytes is calculated and stored.

Figure 7:
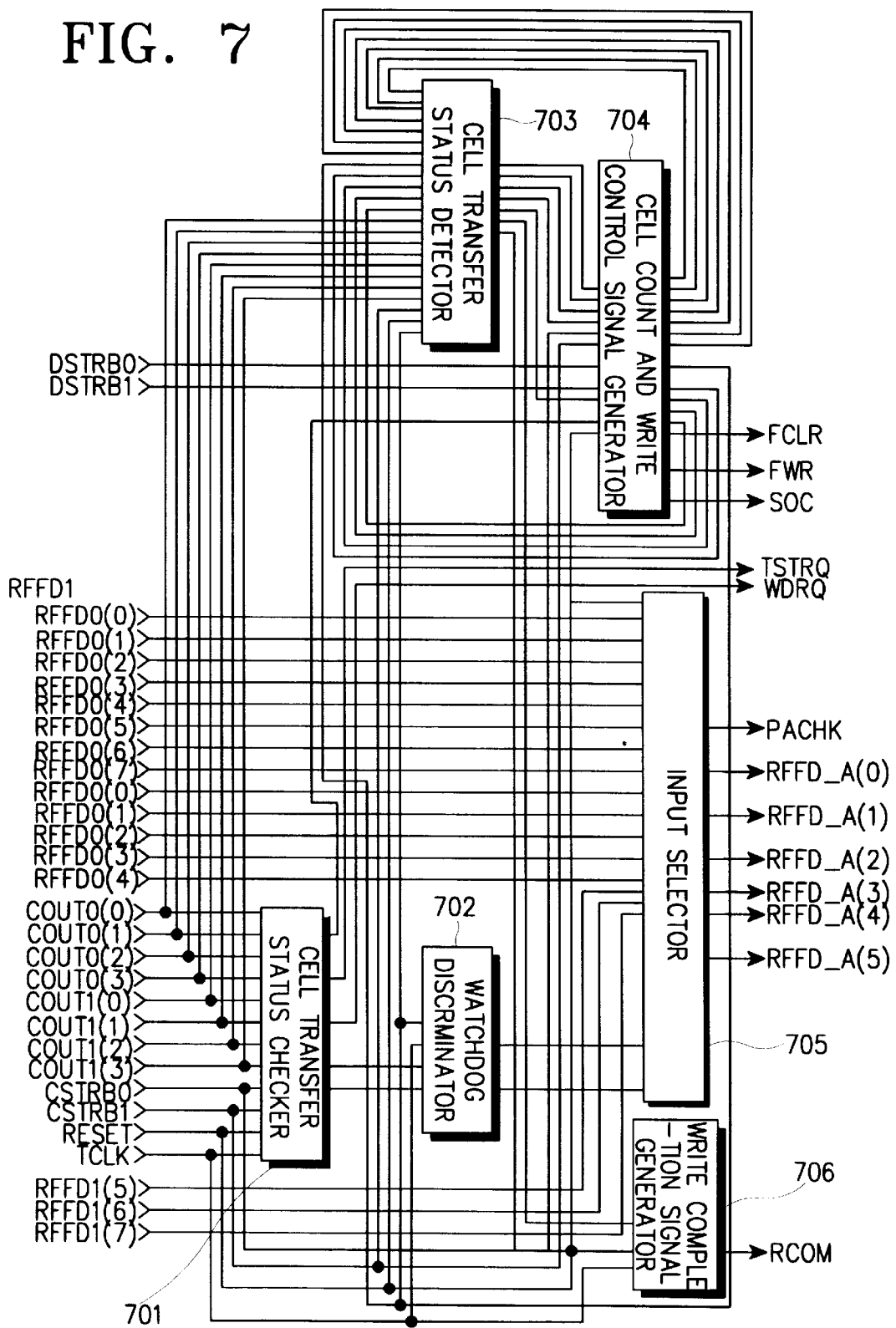
FIG. 7 is a detailed block diagram of a first or second processor matching circuit of the IPC cell multiplexing/demultiplexing circuit as shown in FIG. 4.

FIG. 7 is a detailed circuit diagram of the first or second processor matching circuit 401 or 402 of the IPC cell multiplexing/demultiplexing circuit as shown in FIG. 4. Each processor matching circuit includes a cell transfer status checker 701, a watchdog discriminator 702, a cell transfer status detector 703, a cell count and write control signal generator 704, an input selector 705 and a write completion signal generator 706.

Cell transfer status checker 701 reads data of command data terminals COUT0(0)–COUT0(3) and COUT1(0)–COUT1(3) in synchronization with signals of synchronous cell strobe signal terminals CSTRB0 and CSTRB1 for transferring command data generated from the processor and generates a watchdog signal, a cell transfer start signal and a cell transfer completion signal, etc. The watchdog discriminator 702 discriminates whether there is the watchdog signal generated from the cell transfer status checker 701. The cell transfer status detector 703 discriminates whether the input command data is the cell transfer start signal or a cell receive start signal and whether an input cell of 56 bytes is correctly received. The cell count and write control signal generator 704 generates a counting signal for counting the 56 bytes of the cell transfer status detector 703, generates a SOC (Start Of Cell) signal which can correctly sense the start point of the cell, and generates a write control signal to be provided to the IPC cell storage processor of the next stage. The input selector 705 selects either A or B side of receive data terminals RFFD0–RFFD1 from an output of the watchdog discriminator 702. The write completion signal generator 706 generates a write completion signal indicating whether the received cell of 56 bytes generated from the cell transfer status detector 703 is accurately written.

Figure 8:
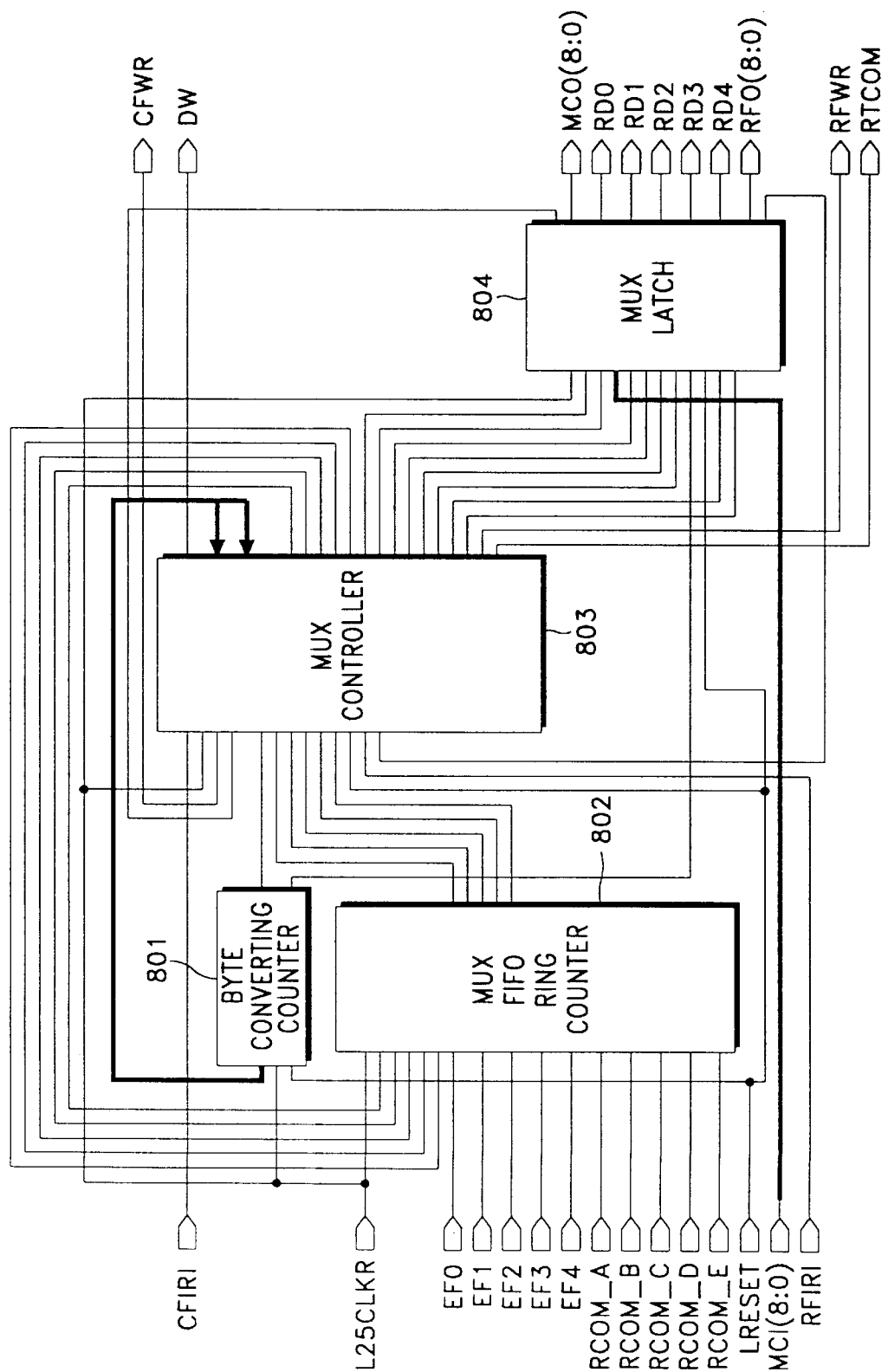
FIG. 8 is a detailed block diagram of a multiplexer of the IPC cell multiplexing/demultiplexing circuit as shown in FIG. 4.

FIG. 8 is a detailed circuit diagram of a multiplexer 407 of the IPC cell multiplexing/demultiplexing circuit 300 as shown in FIG. 4. The multiplexer 407 includes a byte converting counter 801, a multiplexing first-in-first-out (MUX FIFO) ring counter 802, a multiplexing (MUX) controller 803, and a multiplexing (MUX) latch 804.

Byte converting counter 801 generates a counting signal for converting 56 bytes into 63 bytes and a counting signal for dividing the cell of 56 bytes into a unit of 14 bytes. The MUX FIFO ring counter 802 receives a write completion signal indicating that the cell of 56 bytes is written in any FIFO of the second IPC cell storage processor 404, confirms the number of cells that exist in the current FIFO, and generates signals by the confirmed number. The MUX controller 803 receives the write completion signal indicating that writing is completed in any one FIFO and generates a read control signal required to make a signal for reading a specific FIFO. The MUX latch 804 reads 64 bytes of a bus terminal MC1 by a read control signal generated from the MUX controller 803 to generate effective data, and adds an even parity bit for the 64 bytes in order to raise the reliability of the effective data.

Figure 9:
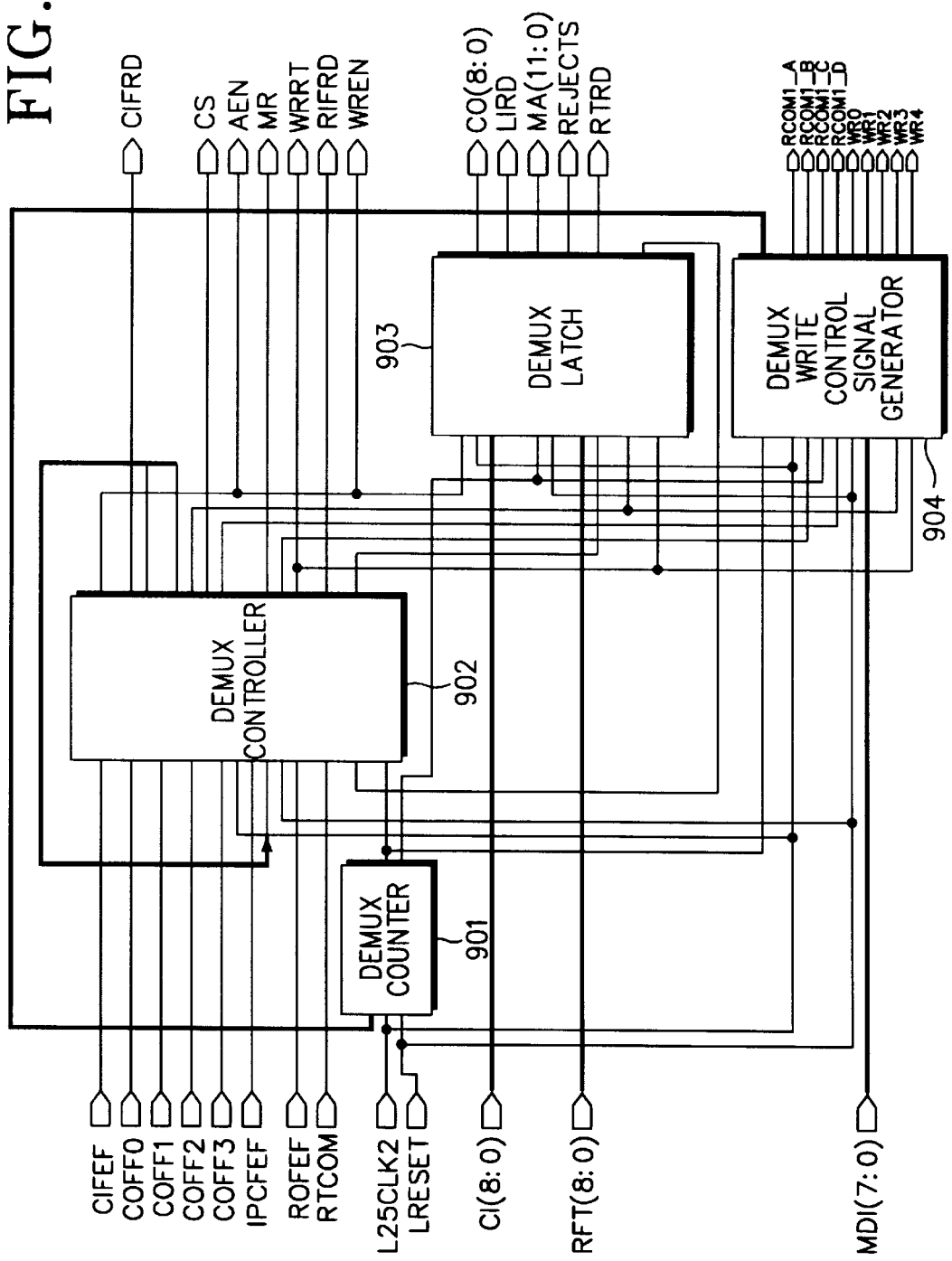
FIG. 9 is a detailed block diagram of a demultiplexer of the IPC cell multiplexing/demultiplexing circuit as shown in FIG. 4.

FIG. 9 is a detailed circuit diagram of a demultiplexer 405 of the IPC cell multiplexing/demultiplexing circuit 300 as shown in FIG. 4. The demultiplexer 405 includes a demultiplexing (DEMUX) counter 901, a demultiplexing (DEMUX) controller 902, a demultiplexing (DEMUX) latch 903, and a demultiplexing (DEMUX) write control signal generator 904.

DEMUX counter 901 generates a counting signal for converting the received 64 bytes into 56 bytes. The DEMUX controller 902 checks the state of the third and first IPC cell storage processors 408 and 403. If there is a cell, the DEMUX controller 902 reads the first byte of the cell to check whether the existing cell is correct through the SOC signal, and determines a write port by using a VPI field in a cell structure of 64 bytes in order to select one specific FIFO. The DEMUX controller 902 also converts the 64 bytes into the 56 bytes by an output of the DEMUX counter 901. The DEMUX latch 903 latches 5 bytes of an output of the DEMUX controller 902, generates an address for reading a VPI value of a look-up table of the memory 406, and writes an input cell by a write enable signal generated from the DEMUX controller 902. The DEMUX write control signal generator 904 generates an address signal so that the DEMUX latch 903 can read data of the memory 406, generates write control signals WR0–WR4 by output signals of the demultiplexing latch 903 and the DEMUX controller 902, and generates one-cell write completion signals RCOM1_A to RCOM1_D.

Figure 10A:
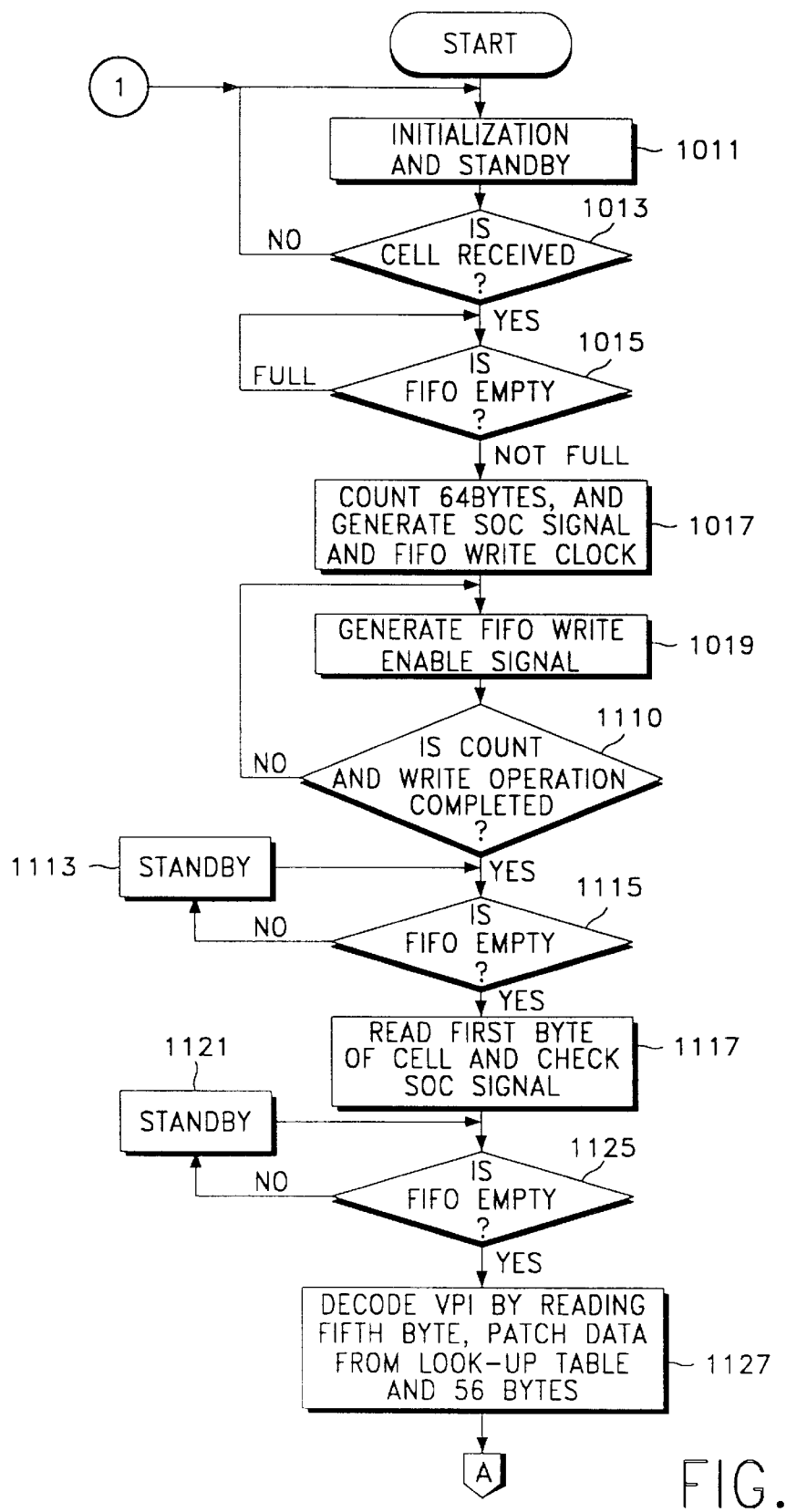
FIGS. 10A to 10C are flow charts of a demultiplexing procedure according to the principles of the present invention.
Figure 10B:
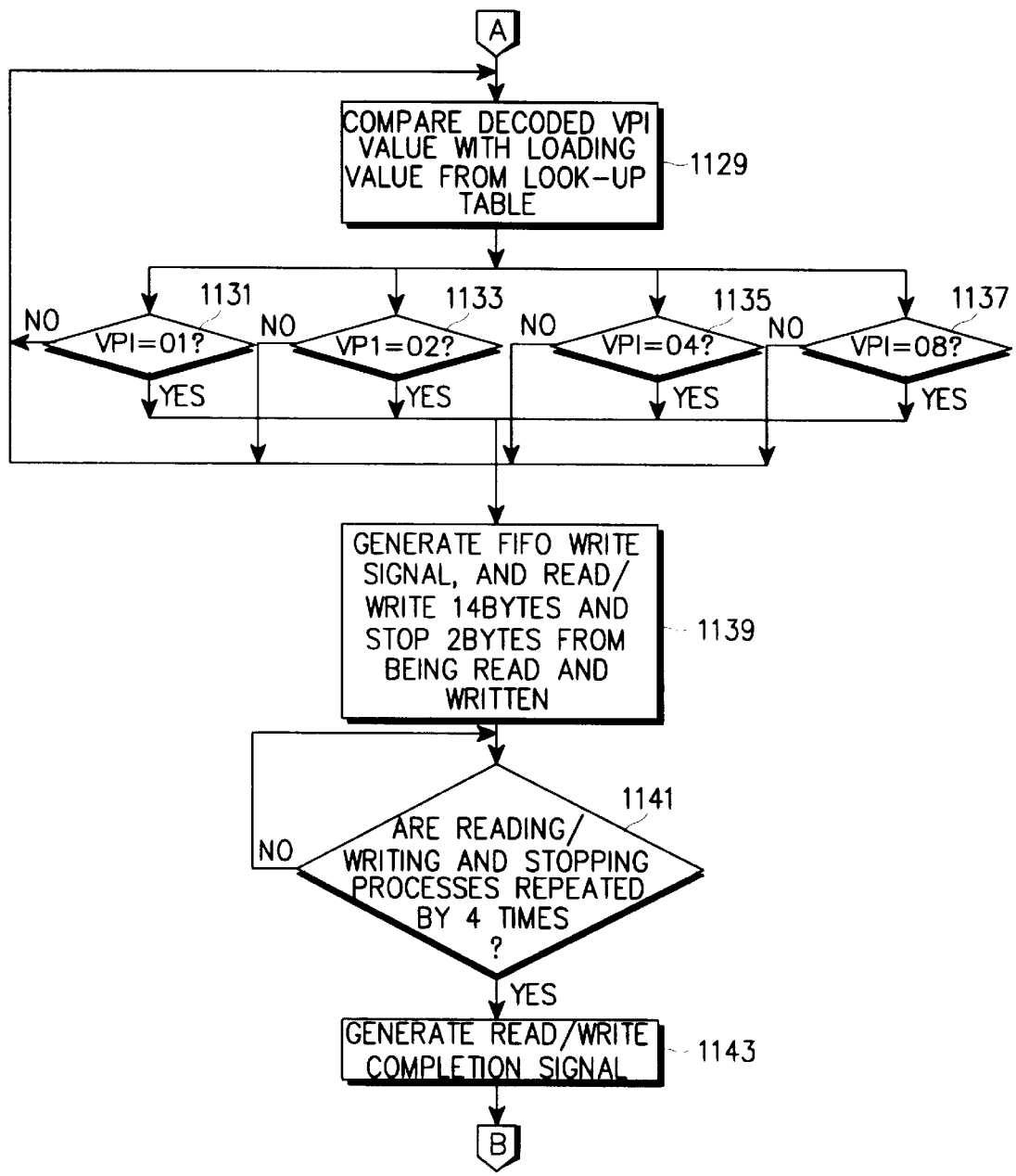
Figure 10C:
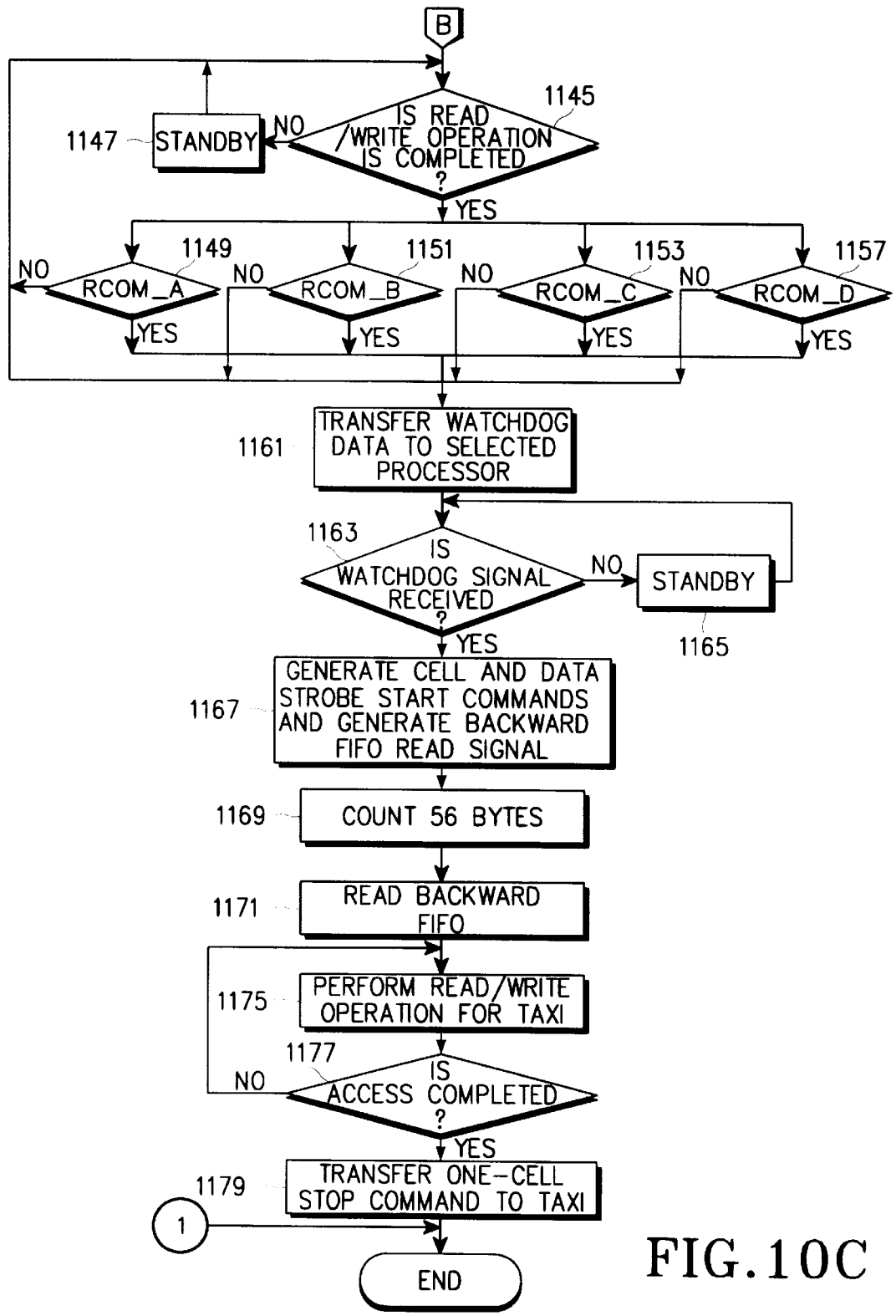

Refer now to FIGS. 10A to 10C which are flow charts of a demultiplexing procedure of IPC cell according to the principles of the present invention. An initialization state and standby are set at step 1011. When the cell is received and whether a forward FIFO is empty is checked at steps 1013–1015. If the FIFO is empty, a count for 64 bytes is started and the SOC signal and a FIFO write clock are generated at step 1017. A FIFO write enable signal is then generated at step 1019. Whether the counting and writing operation is completed is checked at step 1110. If the counting and writing operation is completed at step 1110, whether the FIFO is empty is checked at step 1115. If the FIFO is empty, the first byte of the cell is read and the state of the SOC is checked at step 1117. Whether the FIFO is empty is checked at step 1125. If the FIFO is empty, the fifth byte is read to decode the VPI, memory data is patched from the look-up table and a count for 56 bytes is started at step 1127. The decoded VPI value is compared with a loading value from a look-up table at step 1129. Whether the VPI value is "01", "02", "04" or "08" is checked at steps 1131–1137. A transfer channel of the FIFO is selected according to the VPI value. At step 1139, a FIFO write signal is generated, and 14 bytes are read and written and 2 bytes are stopped from being read and written. At step 1141, whether reading/writing and stopping processes are repeated by 4 times is checked. If so, a read/write completion signal is generated at step 1143. At step 1145, whether the read/write operation is completed is checked. At steps 1149–1157, whether the read/write completion signal correspond to RCOM_A to RCOM_D is checked. Watchdog data is transferred to a selected processor at step 1161. At step 1163, whether the watchdog signal is received is checked. If the watchdog signal is received, cell and data strobe start commands are generated, and a backward FIFO read signal is generated at step 1167. 56 bytes are counted at step 1169, and the backward FIFO is read at step 1171. At step 1175, the read/write operation is performed for a transparent asynchronous transmitter/receiver interface (TAXI). At step 1177, whether access is completed is checked. At step 1179, a one-cell stop command of 0011 is transferred to the TAXI.

Figure 11A:
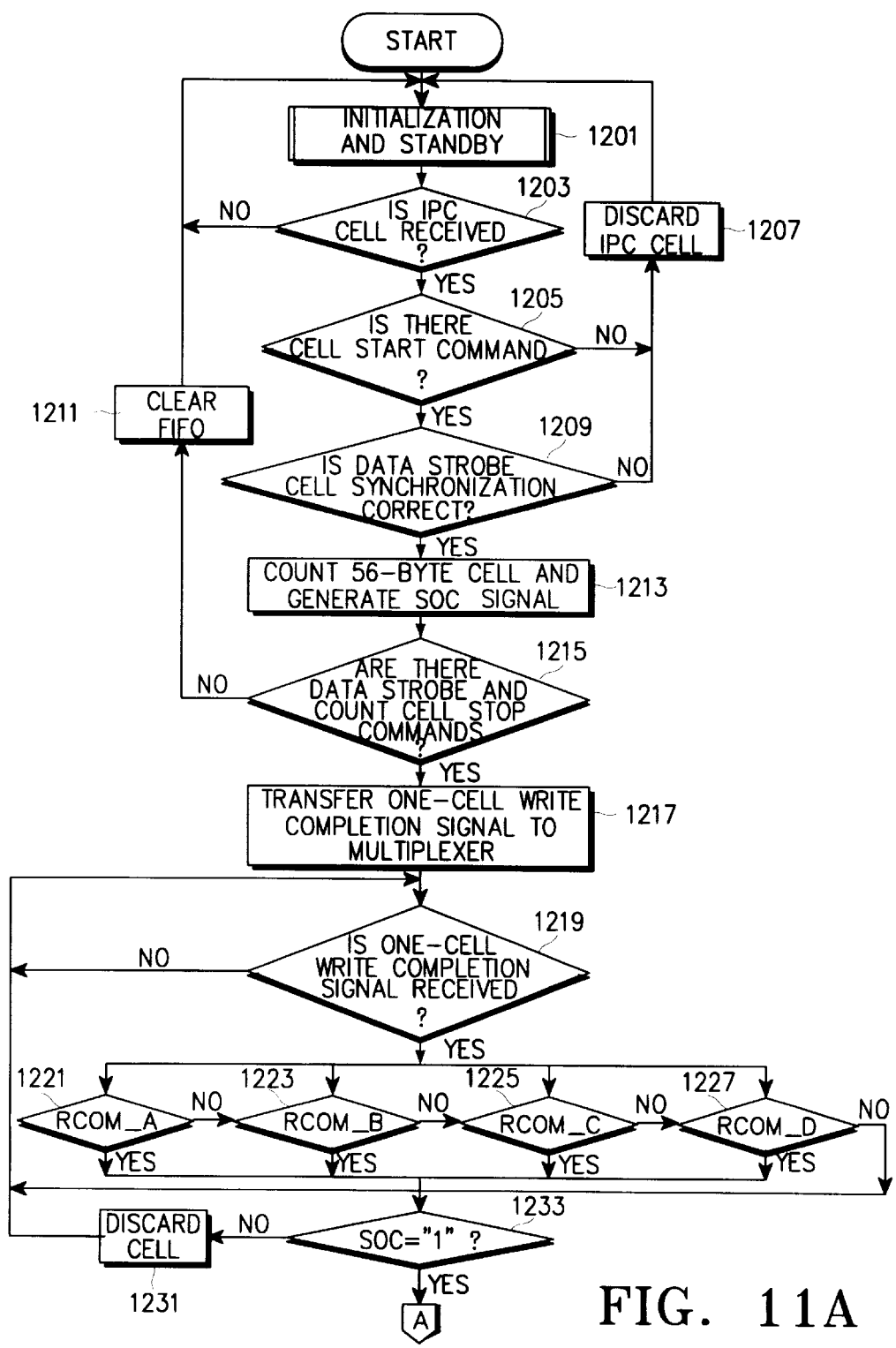
FIGS. 11A and 11B are flow charts of a multiplexing procedure according to the principles of the present invention.
Figure 11B:
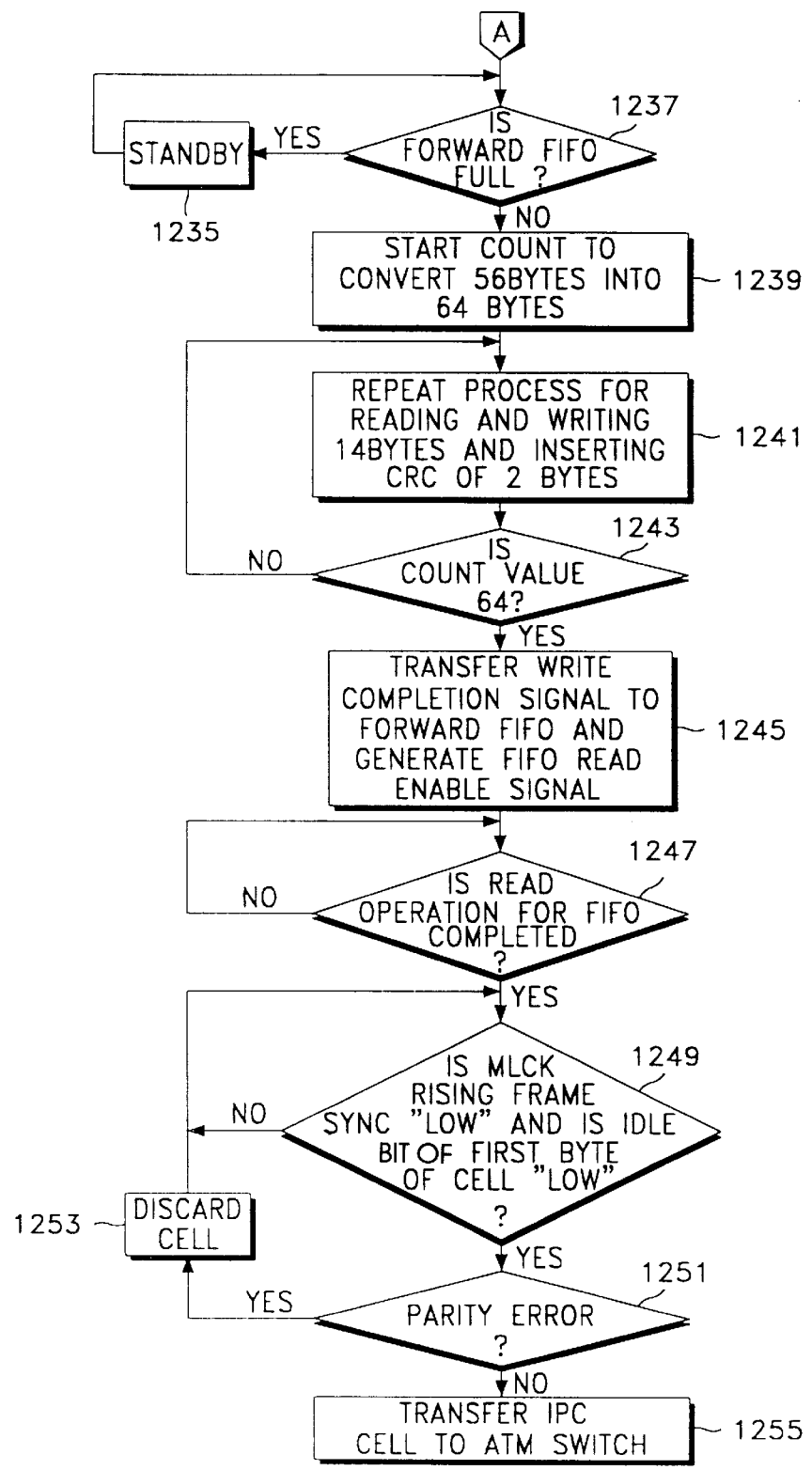

FIGS. 11A and 11B are flow charts of a multiplexing procedure of IPC cell according to the principles of the present invention. An initialization state and standby are set at step 1201. Whether the IPC cell is received is checked at step 1203. Whether there is a cell start command is checked at step 1205. If there is the cell start command, whether data strobe cell synchronization is correct is checked at step 1209. If there is no cell start command at step 1205, the IPC cell is discarded at step 1207. Likewise, if the data strobe cell synchronization is not correct at step 1209, the IPC cell is discarded at step 1207. If the data strobe cell synchronization is correct, however, the 56-byte cell is counted and the SOC signal is generated at step 1213. Whether there are a data strobe and count cell stop commands is checked at step 1215. If there are no these commands, the FIFO is cleared at step 1211. If there are these commands, a one-cell write completion signal is transferred to the multiplexer at step 1207. A check is made to see if the one-cell write completion signal is received at step 1219. If the one-cell write completion signal is received at terminals RCOM_A to RCOM_D, the SOC signal is checked at step 1233. If the SOC signal is 0, the cell is discarded at step 1231. If the SOC signal is "1", whether the forward FIFO is full is checked at step 1237. If it is empty, a count is started to convert 56 bytes to 64 bytes at step 1239. A process for reading 14 bytes and inserting the CRC of 2 bytes is repeated. At step 1243, whether the counted value is 64 is checked. If so, the write completion signal is transferred to a forward FIFO and a FIFO read enable signal is generated at step 1245. At step 1247, whether reading of the FIFO is completed is checked at step 1247. If so, whether a MCLK rising frame synchronization is "LOW" and the idle bit of the first byte of cell is "LOW" are checked at step 1249. If so, a parity error is checked at step 1251. If there is a parity error, the cell is discarded at step 1253. If not, the IPC cell is transferred to the ATM switch.

Figure 12:
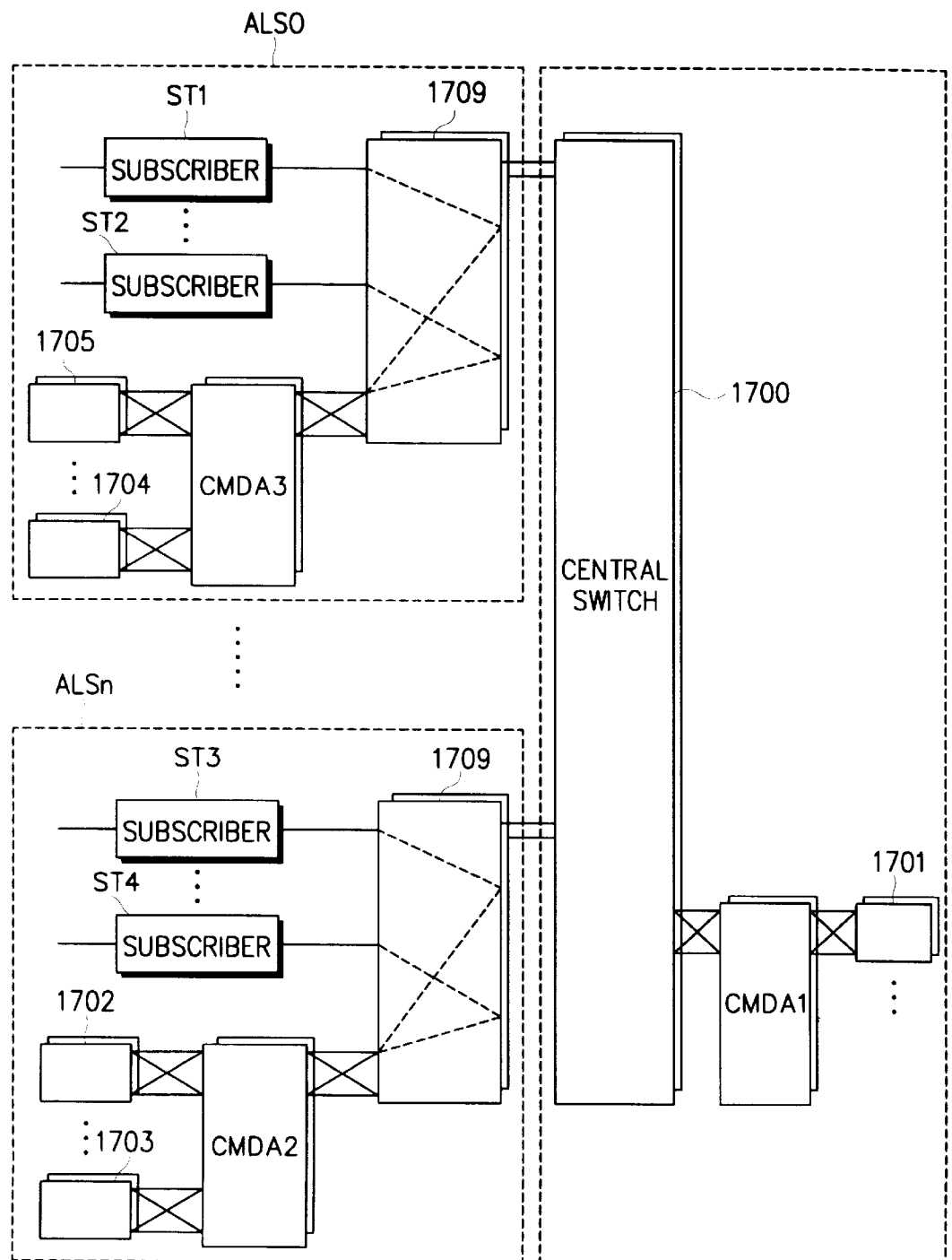
FIG. 12 illustrates one example of an application of a multiplexing/demultiplexing circuit constructed according to the principles of the present invention.

Referring to FIG. 12, in a cell multiplexing/demultiplexing assembly (CMDA) is connected between processors and a local switch.

The detailed description for multiplexing and demultiplexing will now be described in detail with reference to FIGS. 3 to 12 hereinbelow.

Multiplexing

To interface each processor of the OMP 200 and the first to third SCPs 200–206 with the first or second processor matching circuit 401 or 402 of the IPC cell multiplexing/demultiplexing circuit 300 as shown in FIG. 4, the IPC cell is converted into serial data of a 100 Mbps ECL level. The converted data is supplied to the first or second processor matching circuit 401 or 402 which is a reception interface. Among the converted data, 4 bits generate the watchdog signal and the cell transfer start or completion signal as the command data of the cell transfer status checker 701, the watchdog discriminator 702 and the write completion signal generator 706.

In FIG. 7, the command data terminals COUT0(1)–COUT0(3) are in charge of a "A" side, and COUT1(1)–COUT1(3) are in charge of a "B" side. The cell transfer status checker 701 extracts the watchdog signal, the cell transfer start signal and the cell transfer completion signal in synchronization with signals of the command data terminals COUT0(0)–COUT0(3) and COUT1(0)–COUT1(3), signals of the cell strobe terminals CSTRB0 and SCTRB1 and a clock of a clock terminal TCLK The watchdog signal generated from the cell transfer status checker 701 is supplied to the watchdog discriminator 702 for determining the side A or B by checking this watchdog signal.

The cell count and write control signal generator 704 generates the counting signal for counting 56 bytes by signals of data strobe terminals DSTRB0 and DSTRB1, generates the SOC signal which can correctly sense the start point of the cell during multiplexing, and generates the write control signal for writing the cell in a forward FIFO.

By the signals of the cell strobe signal terminals CSTRB0 and CSTRB1, the signal of a write terminal RESET, the output signals of the cell count and write control signal generator 704 and the signals of the command data terminals COUT0(0)–COUT0(3) and COUT1(0)–COUT1(3), whether the cell starts to be transferred or starts to be received and whether the cell of 56 bytes is correctly received are checked. If a number other than 56 bytes is counted, the cell count and write control signal generator 704 generates a write signal. The write completion signal generator 706 generates the write completion signal RCOM if the received cell of 56 bytes is accurately written in the FIFO. The output of the watchdog discriminator 702 is supplied to the input selector 705. The input selector 705 selects either A-side data or B-side data of the data terminals RFFD0(0)–RFFD0(7) by A-side or B-side select signals of the watchdog discriminator 702, and transfers the selected data to the FIFO of the next stage. The FIFO corresponds to the second IPC cell storage processor 404 shown in FIG. 4. The second IPC cell storage processor 404 writes 8-bit data which is the output of the input selector 705 and the SOC signal of one bit to the corresponding FIFO by a unit of one cell of 56 bytes. The output of the second IPC cell storage processor 404 is supplied to the multiplexer 407. The byte converting counter 801 of the multiplexer 407 generates the counting signal for converting 56 bytes to 64 bytes and generates the counting signal for dividing the cell of 56 bytes into 14 bytes.

The MUX FIFO ring counter 802 discriminates signals of status signal terminals EF0–EF4 indicating whether each FIFO of the second IPC cell storage processor 404 is empty and determines the number of cells in the FIFO. The MUX FIFO ring counter 802 supplies signals by the confirmed number to the MUX controller 803.

The MUX controller 803 receives the write completion signal indicating that writing is completed in any one of FIFOs from the MUX FIFO ring counter 802 and generates signals required to make a signal for reading a specific FIFO. For this, a read count value is calculated by 14 bytes speed of 187.7 Mbps and read at a parallel speed of 12.5 Mbps during demultiplexing.

Demultiplexing

The output of 64 bytes of the ATM switch matching circuit 410 is processed in the third IPC cell storage processor 408. Referring to FIG. 9, the DEMUX counter 901 of the demultiplexer 405 generates the counting signal for converting 64 bytes into 56 bytes and generates a signal CON2 necessary for this counting signal. The DEMUX controller 902 determines whether the cell is received in the FIFO by checking the state of the FIFO of the third IPC cell storage processor 408. If there is no cell, the DEMUX controller 902 returns to a standby state. If there is a cell, the DEMUX controller 902 reads the first byte of the cell. The DEMUX controller 902 checks the SOC signal to see if the cell is correct. If the cell is not correct, it is discarded. If the cell is correct, the DEMUX controller 902 successively reads 4 bytes. In order to select a specific FIFO among 4 FIFOs positioned at the front of the demultiplexer 405, a VPI field positioned at the fourth and fifth octets in the cell structure of 64 bytes is used. If the VPI value is "00000001", the first FIFO is selected. If the VPI value is "00000010", the second FIFO is selected. If the VPI value is "00000100", the third FIFO is selected. Finally, if the VPI value is "00001000", the fourth FIFO is selected.

To patch the VPI value from the cell, the DEMUX controller 902 latches the fifth byte and reads a dual port random-access-memory (DPRAM) of the memory 406 storing the VPI value. A write port is determined so as to write the cell in the FIFO by examining if the VPI value read from in order to convert the cell of 56 bytes into 64 bytes, and a dummy data insertion count value of 2 bytes is added to the read count value. In this way, signals needed to convert 56 bytes into 64 bytes are generated and supplied to the MUX latch 804. To judge whether the cell of 56 bytes is accurate, the SOC signal is checked. The MUX controller 803 checks the state of the front FIFO in order to write the cell to the front FIFO just as the MUX latch 804 reads the cell from the FIFO. If the FIFO is empty, the MUX controller 803 sends the write signal, and if the FIFO is not empty, the write signal is not sent. That is, if the front FIFO is empty, the MUX controller 803 writes data read by the MUX latch 804 to the front FIFO and transfers the write completion signal to the front interface.

The MUX latch 804 should transfer receiving data RDX for reading data from the FIFO to the FIFO. This receiving data RDX is generated by combining read signal of 64 bytes received from the MUX controller 803. The MUX latch 804 transfers the receiving data RDX to a corresponding FIFO. The MUX latch 804 reads the cell from the FIFO and simultaneously transfers the effective data to the front FIFO in synchronization with the signal received from the MUX controller 803. In order to raise the reliability of the effective data, the even parity bit for 64 bytes is added when transferred.

The output of the multiplexer 407 is processed in the fourth IPC cell storage processor 409 and supplied to the ATM switch matching circuit 410. The ATM switch matching circuit 410 receives the cell of 64 bytes from the fourth IPC cell storage processor 409 and serves as an interface for transferring 56 bytes at a speed of 100 Mbps not 187.7 Mbps. That is, data is written at a serial the DPRAM is equal to the VPI value extracted from the cell. If they are not equal, the cell is discarded. After the write port is determined, reading and writing are performed by using the count value transferred from the demultiplexing counter 901 in order to convert 64 bytes into 56 bytes. That is, the first to 14-th bytes are read, and the 15-th and 16-th bytes are discarded. The 14 bytes from the 17-th byte are read and the next 2 bytes are discarded. In this way, the 64 bytes are converted into the 56 bytes. The DEMUX controller 902 generates a FIFO read signal CIFRD and DPRAM select read and write signals. The DEMUX latch 903 latches 5 bytes needed in the DEMUX controller 902. The DEMUX latch 903 patches the VPI value from the latched value to generate the address for reading the VPI value from the look-up table of the memory 406. The DEMUX latch 903 receives the write enable signal WREN from the DEMUX controller 902, and writes the input cell in the FIFO. The DEMUX write control signal generator 904 generates the address signal so that the demultiplexer 405 can read data of the memory 406. When writing the cell in the front FIFO, the DEMUX write control signal generator 904 receives signals from the DEMUX latch 903 and the DEMUX controller 902 and generates the write control signals WR0–WR4. After writing one cell in the FIFO, the DEMUX write control signal generator 904 generates the one-cell write completion signals RCOM1_A to RCOM1_D to be transferred to a front transfer link interface.

The output of the demultiplexer 405 is supplied to the first IPC cell storage processor 403 so as to write the cell of 56 bytes in the FIFO. The output cell of the 56 bytes of the first IPC cell storage processor 403 is read by a counter of the first processor matching circuit 401 after the write completion signal is detected. In order to give and take the watchdog signal with a processor to be transferred, the cell transfer start and cell transfer completion watchdog commands are generated. To transfer the cell, the watchdog is checked, the write completion signal RCOM is received, and an output of the counter is initialized. 56 bytes are transferred to a link by adjusting timing of the data strobe signal. After the 56 bytes are transferred, the transfer completion command is sent. If the cell is transferred, the standby state is maintained.

The detailed flows for the multiplexing and demultiplexing are illustrated in FIGS. 10A–10C and 11A and 11B.

FIG. 12 shows one example of an application of the multiplexing/demultiplexing circuit 300 as shown in FIG. 4. To transfer any information to a processor 1705 of a first access local sub-system ALS0 from a processor 1701, the processor 1701 generates the IPC cell. In this case, the VPI value of 00000001 is inserted into a destination processor, that is to the processor 1705. Since the processor 1701 passes through a central switch 1700 and a local switch 1709, ASW_ORG, CSW, ASW_DES values among the first, second and third octets of 56 bytes are given so as to be switched in each switch. Information needed in the processor is inserted and the IPC cell of 56 bytes is transferred to a CMDA1 from the processor 1701. The CMDA1 receives the IPC cell of 56 bytes from the processor 1701, changes a cell format to 64 bytes and transfers the IPC cell to the central switch 1700. The central switch 1700 switches the IPC cell by CSW of the upper 3 octets among the cell format changed to 64 octets. In the first access local sub-system ALS0, the local switch 1709 switches the IPC cell of 64 octets by ASW_DES. The IPC cell passing through the local switch 1709 is transferred to a CMDA3. The CMDA3 reads the upper 5 octets among 64 octets and latches the VPI value. A demultiplexer fetches the VPI value from the look-up table of the DPRAM. The latched VPI value is compared with the VPI value fetched by the demultiplexer. The IPC cell is written in a FIFO if the VPI values are equal to each other. The demultiplexer converts the cell of 64 bytes into the cell of 56 bytes by repeatedly reading 14 bytes and discarding 2 bytes. If the 56 bytes are written, they are transferred to a TAXI link and reaches the processor 1705 of the final destination.

As described above, the construction of IPC transmitter/receiver hardware that is matched the processor can be simplified. Therefore, the size of a system is reduced and the switching resources are efficiently managed. Furthermore, the high integration of a circuit is facilitated.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof Therefore, it is intended that the present invention not be limited to the particular embodiment disclosed as the best mode contemplated for carrying out the present invention, but that the present invention includes all embodiments falling within the scope of the appended claims.

What is claimed is:

1. A system for multiplexing/demultiplexing an asynchronous transfer mode (ATM) interprocessor communication (IPC) cell in a ATM exchange, comprising:

an operation and maintenance processor;

first to third subscriber control processors;

an ATM switch; and an interprocessor communication cell multiplexing/demultiplexing circuit connected between said operation and maintenance processor, said first to third subscriber control processors and said ATM switch for reading a virtual path identifier value of an interprocessor communication cell received from said ATM switch for selection of a destination processor, for transferring the received interprocessor communication cell to the selected destination processor at a given speed, and for multiplexing an interprocessor communication cell received from a specific processor via one of said operation and maintenance processor and said first to third subscriber control processors;

wherein said interprocessor communication cell multiplexing/demultiplexing circuit comprise first and second processor matching circuits, first, second and third cell storage processors, a demultiplexer, a multiplexer, and an ATM switch matching circuit.

2. The system of claim 1, wherein:

said second cell storage processor temporarily stores data received from and to be transferred to said first and second processor matching circuits;

said multiplexer multiplexes the interprocessor communication cell generated from said second cell storage processor;

said fourth cell storage processor temporarily stores an output of said multiplexer;

said memory stores data for determining a transmission route of the interprocessor communication cell;

said ATM switch matching circuit matches with said ATM switch;

said third cell storage processor temporarily stores the interprocessor communication cell generated from said ATM switch matching circuit;

said demultiplexer demultiplexes an output of said third cell storage processor and transfers a demultiplexed output to a destination determined from said memory; and said first cell storage processor temporarily stores an output of said demultiplexer.

3. The system of claim 2, said demultiplexer comprising:

a counter for generating a counting signal for converting received 64 bytes into 56 bytes;

a controller for checking the state of said third and first cell storage processors, reading the first byte of the cell to check whether the existing cell is correct through a start-of-cell signal, determining a write port by using a virtual path identifier field in a cell structure of 64 bytes in order to select a specific first-in-first-out, and converting the 64 bytes into the 56 bytes by an output of said counter;

a latch for latching 5 bytes of an output of said controller, generating an address for reading a virtual path identifier value of a look-up table of said memory, and writing an input cell by a write control signal generated from said controller; and a write control signal generator for generating an address signal so that said latch can read data of said memory, generating write control signals by output signals of said latch and said controller, and generating one-cell write completion signals.

4. The system of claim 1, said first processor matching circuit comprising:

a cell transfer status checker for reading data of command data terminals in synchronization with signals of synchronous cell strobe signal terminals for transferring command data generated from the selected destination processor, and generating a watchdog signal, a cell transfer start signal and a cell transfer completion signal;

a watchdog discriminator for discriminating whether said watchdog signal is generated from said cell transfer status checker;

a cell transfer status detector for discriminating whether the input command data is the cell transfer start signal or a cell receive start signal and whether an input cell of 56 bytes is correctly received;

a cell count and write control signal generator for generating a counting signal for counting 56 bytes of said count and write control signal generator, generating a start-of-cell signal for correctly sensing a start point of the interprocessor communication cell, and generating a write control signal to be provided to the cell storage processor of the next stage;

an input selector for selecting either side of reception data terminals from an output of said watchdog discriminator; and a write completion signal generator for generating a write completion signal indicating whether the received interprocessor communication cell of 56 bytes generated from said cell transfer status detector is accurately written.

5. The system of claim 1, said second processor matching circuit comprising:

a cell transfer status checker for reading data of command data terminals in synchronization with signals of synchronous cell strobe signal terminals for transferring command data generated from the selected destination processor, and generating a watchdog signal, a cell transfer start signal and a cell transfer completion signal;

a watchdog discriminator for discriminating whether said watchdog signal is generated from said cell transfer status checker;

a cell transfer status detector for discriminating whether the input command data is the cell transfer start signal or a cell receive start signal and whether an input cell of 56 bytes is correctly received;

a cell count and write control signal generator for generating a counting signal for counting 56 bytes of said count and write control signal generator, generating a start-of-cell signal for correctly sensing a start point of the interprocessor communication cell, and generating a write control signal to be provided to the cell storage processor of the next stage;

an input selector for selecting either side of reception data terminals from an output of said watchdog discriminator; and a write completion signal generator for generating a write completion signal indicating whether the received interprocessor communication cell of 56 bytes generated from said cell transfer status detector is accurately written.

6. The system of claim 1, said multiplexer comprising:

a byte converting counter for generating a counting signal for converting 56 bytes into 64 bytes and a counting signal for dividing the cell of 56 bytes into a unit of 14 bytes;

a first-in-first-out ring counter for receiving a write completion signal indicating that the cell of 56 bytes is written in any first-in-first-out of said second cell storage processor, confirming how many cells exist in a current first-in-first-out, and generating signals by the confirmed number;

a controller coupled to receive the write completion signal indicating that writing is completed in any one of the first-in-first-out, for generating a read control signal required to make a signal for reading a specific first-in-first-out; and a latch for reading 64 bytes of a bus terminal by said read control signal generated from said controller to generate effective data, and adding an even parity bit for the 64 bytes in order to raise reliability of said effective data.

7. The system of claim 1, said demultiplexer comprising:

a counter for generating a counting signal for converting received 64 bytes into 56 bytes;

a controller for checking the state of said third and first cell storage processors, reading the first byte of the cell to check whether the existing cell is correct through a start-of-cell signal, determining a write port by using a virtual path identifier field in a cell structure of 64 bytes in order to select a specific first-in-first-out, and converting the 64 bytes into the 56 bytes by an output of said counter;

a latch for latching 5 bytes of an output of said controller, generating an address for reading a virtual path identifier value of a look-up table of said memory, and writing an input cell by a write control signal generated from said controller; and a write control signal generator for generating an address signal so that said latch can read data of said memory, generating write control signals by output signals of said latch and said controller, and generating one-cell write completion signals.

8. A method for demultiplexing/multiplexing an interprocessor communication cell in an asynchronous transfer mode (ATM) exchange having an operation and maintenance processor, first to third subscriber control processors and an ATM switch, said method comprising the steps of:

receiving an interprocessor communication cell and determining whether a forward first-in-first-out is empty;

when the first-in-first-out is empty, counting 64 bytes, and generating a start-of-cell signal and a first-in-first-out write clock, and a first-in-first-out write enable signal;

determining whether counting and writing operation is completed;

when the counting and writing operation is completed, checking the first-in-first-out is empty;

when the first-in-first-out is not empty, returning to a standby state;

alternatively, when the first-in-first-out is empty, determining the state of the start-of-cell signal by reading the first byte of the interprocessor communication cell;

determining whether the first-in-first-out is empty;

when the first-in-first-out is empty, reading a fifth byte to decode a virtual path identifier, fetching memory data from a look-up table, and counting 56 bytes;

determining whether the virtual path identifier value corresponds to one of "01", "02", "04" or "08" by comparing the decoded virtual path identifier value with a loading value from the look-up table;

selecting a transfer channel of the first-in-first-out according to the virtual path identifier value, generating a first-in-first-out write signal, reading and writing 14 bytes, stopping 2 bytes from being read and written, and checking whether reading/writing and stopping processes are repeated by 4 times;

when the reading/writing and stopping processes operations are repeated by 4 times, generating a read/write completion signal and determining whether the read/write operation is completed;

determining whether the read/write completion signal is received at respective terminals;

when the read/write completion signal is received at respective terminals, transferring watchdog data to a selected processor and checking whether a watchdog signal is received;

when the watchdog signal is received, generating cell and data strobe start commands, and generating a first-in-first-out read signal;

counting 56 bytes, reading a backward first-in-first-out, performing the read/write operation for a transparent asynchronous transmitter/receiver interface, and transferring a one-cell stop command to the transparent asynchronous transmitter/receiver interface when access is completed;

determining whether the interprocessor communication cell is received during a standby state, and determining whether data strobe cell synchronization is correct when there is a cell start command;

when the data strobe cell synchronization is correct, counting a 56-byte cell and generating the start-of-cell signal;

clearing the backward first-in-first-out when there are no data strobe and count cell stop commands, and transferring a one-cell write completion signal to a multiplexer;

when the one-cell write completion signal is received to respective terminals, checking the start-of-cell signal;

when the start-of-cell signal exhibits a first state, discarding the cell;

when the start-of-cell signal exhibits a second state, checking whether the forward first-in-first-out is full;

when the forward first-in-first-out is empty, starting count to convert 56 bytes to 64 bytes, and repeating a process of reading 14 bytes and inserting a cyclic redundancy check code of 2 bytes;

when a counted value is 64, transferring the write completion signal to the forward first-in-first-out, generating a first-in-first-out read enable signal, and checking whether reading the first-in-first-out is completed; and when the reading of the first-in-first-out is completed, determining whether a clock rising frame synchronization corresponds to said first state and the idle bit of the first byte of the cell indicates said first state, discarding the interprocessor communication cell when there is a parity error, and transferring the interprocessor communication cell to the ATM switch when there is no parity error.

9. A system for multiplexing/demultiplexing an asynchronous transfer mode (ATM) interprocessor communication (IPC) cell in an ATM exchange, comprising:

an operation and maintenance processor;

first to third subscriber control processors;

an ATM switch; and a cell multiplexing/demultiplexing circuit;

wherein said cell multiplexing/demultiplexing circuit comprises first and second processor matching circuits, first and second cell storage processors, a demultiplexer, a memory, a third cell storage processor, a multiplexer, a fourth cell storage processor and an ATM switch;

said first and second processor matching circuits being matched to said operation and maintenance processor and said first to third subscriber control processors to transfer control signals and data;

said second cell storage processor temporarily storing data received from and to be transferred to said first and second processor matching circuits;

said multiplexer multiplexing an interprocessor communication cell generated from said second cell storage processor;

said fourth cell storage processor temporarily storing an output of said multiplexer;

said memory storing data for determining a transmission route of the interprocessor communication cell;

said ATM switch matching circuit being matched with said ATM switch;

said third cell storage processor temporarily storing the interprocessor communication cell generated from said ATM switch matching circuit;

said demultiplexer demultiplexing an output of said third cell storage processor and transferring a demultiplexed output to a destination determined from said memory; and said first cell storage processor temporarily storing an output of said demultiplexer.

10. The system of claim 9, said first processor matching circuit comprising:

a cell transfer status checker for reading data of command data terminals in synchronization with signals of synchronous cell strobe signal terminals for transferring command data generated from a destination processor, and generating a watchdog signal, a cell transfer start signal and a cell transfer completion signal;

a watchdog discriminator for discriminating whether said watchdog signal is generated from said cell transfer status checker;

a cell transfer status detector for discriminating whether the input command data is the cell transfer start signal or a cell receive start signal and whether an input cell of 56 bytes is correctly received;

a cell count and write control signal generator for generating a counting signal for counting 56 bytes of said count and write control signal generator, generating a start-of-cell signal for correctly sensing a start point of the interprocessor communication cell, and generating a write control signal to be provided to the cell storage processor of the next stage;

an input selector for selecting either side of reception data terminals from an output of said watchdog discriminator; and a write completion signal generator for generating a write completion signal indicating whether the received interprocessor communication cell of 56 bytes generated from said cell transfer status detector is accurately written.

11. The system of claim 9, said second processor matching circuit comprising:

a cell transfer status checker for reading data of command data terminals in synchronization with signals of synchronous cell strobe signal terminals for transferring command data generated from a destination processor, and generating a watchdog signal, a cell transfer start signal and a cell transfer completion signal;

a watchdog discriminator for discriminating whether said watchdog signal is generated from said cell transfer status checker;

a cell transfer status detector for discriminating whether the input command data is the cell transfer start signal or a cell receive start signal and whether an input cell of 56 bytes is correctly received;

a cell count and write control signal generator for generating a counting signal for counting 56 bytes of said count and write control signal generator, generating a start-of-cell signal for correctly sensing a start point of the interprocessor communication cell, and generating a write control signal to be provided to the cell storage processor of the next stage;

an input selector for selecting either side of reception data terminals from an output of said watchdog discriminator; and a write completion signal generator for generating a write completion signal indicating whether the received interprocessor communication cell of 56 bytes generated from said cell transfer status detector is accurately written.

12. The system of claim 9, said multiplexer comprising:

a byte converting counter for generating a counting signal for converting 56 bytes into 64 bytes and a counting signal for dividing the cell of 56 bytes into a unit of 14 bytes;

a first-in-first-out ring counter for receiving a write completion signal indicating that the cell of 56 bytes is written in any first-in-first-out of said second cell storage processor, confirming how many cells exist in a current first-in-first-out, and generating signals by the confirmed number;

a controller coupled to receive the write completion signal indicating that writing is completed in any one of the first-in-first-out, for generating a read control signal required to make a signal for reading a specific first-in-first-out; and a latch for reading 64 bytes of a bus terminal by said read control signal generated from said controller to generate effective data, and adding an even parity bit for the 64 bytes in order to raise reliability of said effective data.

13. The system of claim 12, said demultiplexer comprising:

a counter for generating a counting signal for converting received 64 bytes into 56 bytes;

a controller for checking the state of said third and first cell storage processors, reading the first byte of the cell to check whether the existing cell is correct through a start-of-cell signal, determining a write port by using a virtual path identifier field in a cell structure of 64 bytes in order to select a specific first-in-first-out, and converting the 64 bytes into the 56 bytes by an output of said counter;

a latch for latching 5 bytes of an output of said controller, generating an address for reading a virtual path identifier value of a look-up table of said memory, and writing an input cell by a write control signal generated from said controller; and a write control signal generator for generating an address signal so that said latch can read data of said memory, generating write control signals by output signals of said latch and said controller, and generating one-cell write completion signals.

14. The system of claim 9, said demultiplexer comprising:

a counter for generating a counting signal for converting received 64 bytes into 56 bytes;

a controller for checking the state of said third and first cell storage processors, reading the first byte of the cell to check whether the existing cell is correct through a start-of-cell signal, determining a write port by using a virtual path identifier field in a cell structure of 64 bytes in order to select a specific first-in-first-out, and converting the 64 bytes into the 56 bytes by an output of said counter;

a latch for latching 5 bytes of an output of said controller, generating an address for reading a virtual path identifier value of a look-up table of said memory, and writing an input cell by a write control signal generated from said controller; and a write control signal generator for generating an address signal so that said latch can read data of said memory, generating write control signals by output signals of said latch and said controller, and generating one-cell write completion signals.

15. A system for multiplexing/demultiplexing an asynchronous transfer mode (ATM) interprocessor communication (IPC) cell in an ATM exchange, comprising:

an operation and maintenance processor;

first to third subscriber control processors;

an ATM switch; and a cell multiplexing/demultiplexing circuit;

wherein said cell multiplexing/demultiplexing circuit comprises a processor matching circuit matched to said operation and maintenance processor and said first to third subscriber control processors to transfer control signals and data, a cell storage processor connected to said processor matching circuit, a demultiplexer for demultiplexing and input thereto and for transferring a demultiplexed output to a determined destination via said processor matching circuit, and an additional cell storage processor connected between said ATM switch and said demultiplexer for temporarily storing an interprocessor communication cell from said ATM switch, said cell storage processor temporarily storing an output of said demultiplexer.

16. The system of claim 15, said processor matching circuit comprising:

a cell transfer status checker for reading data of command data terminals in synchronization with signals of synchronous cell strobe signal terminals for transferring command data generated from a destination processor, and generating a watchdog signal, a cell transfer start signal and a cell transfer completion signal;

a watchdog discriminator for discriminating whether said watchdog signal is generated from said cell transfer status checker;

a cell transfer status detector for discriminating whether the input command data is the cell transfer start signal or a cell receive start signal and whether an input cell of 56 bytes is correctly received;

a cell count and write control signal generator for generating a counting signal for counting 56 bytes of said count and write control signal generator, generating a start-of-cell signal for correctly sensing a start point of the interprocessor communication cell, and generating a write control signal to be provided to the cell storage processor of the next stage;

an input selector for selecting either side of reception data terminals from an output of said watchdog discriminator; and a write completion signal generator for generating a write completion signal indicating whether the received interprocessor communication cell of 56 bytes generated from said cell transfer status detector is accurately written.

17. The system of claim 15, said demultiplexer comprising:

a counter for generating a counting signal for converting received 64 bytes into 56 bytes;

a controller for checking the state of said cell storage processor and said additional cell storage processor, reading the first byte of the cell to check whether the existing cell is correct through a start-of-cell signal, determining a write port by using a virtual path identifier field in a cell structure of 64 bytes in order to select a specific first-in-first-out, and converting the 64 bytes into the 56 bytes by an output of said counter;

a latch for latching 5 bytes of an output of said controller, generating an address for reading a virtual path identifier value of a look-up table of said memory, and writing an input cell by a write control signal generated from said controller; and a write control signal generator for generating an address signal so that said latch can read data of said memory, generating write control signals by output signals of said latch and said controller, and generating one-cell write completion signals.

18. The system of claim 15, said cell multiplexing/demultiplexing circuit further comprising a memory connected to said demultiplexer for storing data for determining a transmission route of the interprocessor communication cell, to said determined destination.

19. A system for multiplexing/demultiplexing an asynchronous transfer mode (ATM) interprocessor communication (IPC) cell in an ATM exchange, comprising:

an operation and maintenance processor;

first to third subscriber control processors;

an ATM switch; and a cell multiplexing/demultiplexing circuit;

wherein said cell multiplexing/demultiplexing circuit comprises a processor matching circuit matched to said operation and maintenance processor and said first to third subscriber control processors to transfer control signals and data, a cell storage processor connected to said processor matching circuit for temporarily storing data received from and to be transferred to said processor matching circuit, a multiplexer for multiplexing an interprocessor communication cell generated from said cell storage processor, and an additional cell storage processor connected between said multiplexer and said ATM switch for temporarily storing an output of said multiplexer.

20. The system of claim 19, said processor matching circuit comprising:

a cell transfer status checker for reading data of command data terminals in synchronization with signals of synchronous cell strobe signal terminals for transferring command data generated from a destination processor, and generating a watchdog signal, a cell transfer start signal and a cell transfer completion signal;

a watchdog discriminator for discriminating whether said watchdog signal is generated from said cell transfer status checker;

a cell transfer status detector for discriminating whether the input command data is the cell transfer start signal or a cell receive start signal and whether an input cell of 56 bytes is correctly received;

a cell count and write control signal generator for generating a counting signal for counting 56 bytes of said count and write control signal generator, generating a start-of-cell signal for correctly sensing a start point of the interprocessor communication cell, and generating a write control signal to be provided to the cell storage processor of the next stage;

an input selector for selecting either side of reception data terminals from an output of said watchdog discriminator; and a write completion signal generator for generating a write completion signal indicating whether the received interprocessor communication cell of 56 bytes generated from said cell transfer status detector is accurately written.

21. The system of claim 19, said multiplexer comprising:

a byte converting counter for generating a counting signal for converting 56 bytes into 64 bytes and a counting signal for dividing the cell of 56 bytes into a unit of 14 bytes;

a first-in-first-out ring counter for receiving a write completion signal indicating that the cell of 56 bytes is written in any first-in-first-out of said additional cell storage processor, confirming how many cells exist in a current first-in-first-out, and generating signals by the confirmed number;

a controller coupled to receive the write completion signal indicating that writing is completed in any one of the first-in-first-out, for generating a read control signal required to make a signal for reading a specific first-in-first-out; and a latch for reading 64 bytes of a bus terminal by said read control signal generated from said controller to generate effective data, and adding an even parity bit for the 64 bytes in order to raise reliability of said effective data.

22. A system for multiplexing/demultiplexing an asynchronous transfer mode (ATM) interprocessor communication (IPC) cell in an ATM exchange, comprising:

an operation and maintenance processor;

first to third subscriber control processors;

an ATM switch; and an interprocessor communication cell multiplexing/demultiplexing circuit connected between said operation and maintenance processor, said first to third subscriber control processors and said ATM switch for reading a virtual path identifier value of an interprocessor communication cell received from said ATM switch for selection of a destination processor, for transferring the received interprocessor communication cell to the selected destination processor at a given speed, and for multiplexing an interprocessor communication cell received from a specific processor via one of said operation and maintenance processor and said first to third subscriber control processors;

wherein said interprocessor communication cell multiplexing/demultiplexing circuit comprises first and second processor matching circuits matched to said operation and maintenance processor and to said first to third subscriber control processors to transfer control signals and data, first and second cell storage processors each connected to said first and second processor matching circuits, a demultiplexer connected to said first cell storage processor, a memory connected to said demultiplexer, a third cell storage processor connected to said demultiplexer, a multiplexer connected to said second cell storage processor, a fourth cell storage processor connected to said multiplexer, and an ATM switch matching circuit connected to said third and fourth cell storage processors.

* * * * *